US012677727B2

(12) United States Patent　　　　(10) Patent No.:　US 12,677,727 B2
Holmes　　　　　　　　　　　　　　　(45) Date of Patent:　　　Jul. 14, 2026

(54) PRECISION SEED DROP SPREADING DEVICE WITH FLUTED ROLLER AND GROUND WHEEL MECHANISM

(71) Applicant: Douglas Andrew Holmes, Benzonia, MI (US)

(72) Inventor: Douglas Andrew Holmes, Benzonia, MI (US)

(73) Assignee: DOWN BURST SEEDERS LLC, Benzonia, MI (US)

( * ) Notice: Subject to any disclaimer, the term of this patent is extended or adjusted under 35 U.S.C. 154(b) by 351 days.

(21) Appl. No.: 18/515,125

(22) Filed: Nov. 20, 2023

(65) Prior Publication Data

US 2024/0164245 A1　　May 23, 2024

Related U.S. Application Data

(60) Provisional application No. 63/426,438, filed on Nov. 18, 2022.

(51) Int. Cl.
　　*A01C 7/16*　　　　(2006.01)
　　*A01C 7/20*　　　　(2006.01)
(52) U.S. Cl.
　　CPC . *A01C 7/16* (2013.01); *A01C 7/20* (2013.01)
(58) Field of Classification Search
　　CPC .. A01C 7/16; A01C 7/163; A01C 7/20; A01C 7/206
See application file for complete search history.

(56) References Cited

U.S. PATENT DOCUMENTS

| | | | | |
|---|---|---|---|---|
| 4,609,131 | A | * | 9/1986 | Tieben ..................... A01C 7/16 |
| | | | | 222/266 |
| 6,285,938 | B1 | * | 9/2001 | Lang et al. ......... A01M 7/0089 |
| | | | | 239/10 |
| 2019/0387665 | A1 | * | 12/2019 | Finlayson .............. A01C 7/123 |

FOREIGN PATENT DOCUMENTS

CA　　　　　2958636 A1 * 7/2012　.............. A01C 7/088

* cited by examiner

*Primary Examiner* — Tara Mayo
(74) *Attorney, Agent, or Firm* — Taylor Dykema PLLC; Eric Kleinertz

(57)　　　　　　　ABSTRACT

A device may include a seed hopper fluidly connected to a seed meter, the seed meter may comprise: a fluted roller, a follower, the follower including one or more brushes, wherein the fluted roller may include one or more grooves, and wherein the one or more brushes may be configured to abut portions of the fluted roller; a roller shutoff disposed adjacent to the fluted roller and including one or more teeth configured to interface with the one or more grooves; a funnel fluidly connected to an outlet chamber, wherein the outlet chamber may be fluidly connected to the funnel, a blower, and a drop tube. The blower may introduce air into the outlet chamber and drop tube. A ground wheel may be mechanically coupled to the fluted roller and roller shutoff, wherein, rotation of the ground wheel causes rotation of the fluted roller and roller shutoff.

11 Claims, 12 Drawing Sheets

302

PRECISION SEED DROP SPREADING DEVICE WITH FLUTED ROLLER AND GROUND WHEEL MECHANISM

FIELD OF INVENTION

The present disclosure is in the field of farming equipment. Specifically, seed spreading systems and devices.

INTRODUCTION

Previous approaches for drop spreading devices have typically involved gravity-based mechanisms for dispensing seeds onto the ground. These devices often include a full width hopper and drop seed directly from the bottom of the hopper. Effectively the seed/product is "spread" in the lateral direction ahead of time by filling the length of the hopper evenly with seed/product. The metering system consists of adjustable width slot running the length of the hopper in which the seed/product gravity feeds through. Currently, the only way to stop dropping product is to close the slot completely via a lever or remote control. There is no positive speed control of the seed rate, typically the faster the drop spreader is travelling, the lighter the seed rate for a given slot opening setting. These spreaders are essentially "hour glass" meters in which the speed of travel needs to be precise and consistent to get the desired application rate. These metering mechanisms are not well suited for small seeds with very low application rates. For example, it would be virtually impossible to accurately spread White Clover at 5 lb/acre with a conventional drop spreader.

None of the above approaches have provided a comprehensive solution that combines the features described in this disclosure. The present invention addresses these limitations by providing a drop spreading device that offers precise seed metering, controlled seed trajectory, and adaptability to different seed types.

SUMMARY

Aspects of the present disclosure relate to a drop spreading device, including: a seed hopper disposed above and fluidly connected to a seed meter, the seed meter including: a follower disposed above a fluted roller, the follower including one or more brushes, wherein the fluted roller includes one or more grooves, and wherein the one or more brushes are configured to abut portions of the fluted roller located between the one or more grooves; a roller shutoff disposed adjacent to the fluted roller, the roller shutoff including one or more teeth, wherein the one or more teeth are configured to interface with the one or more grooves by selectably occupying a volume of the one or more grooves; a funnel disposed beneath the fluted roller and fluidly connected to an outlet chamber, the outlet chamber fluidly connected to the funnel, a blower, and a drop tube, wherein the blower is configured to introduce air into the outlet chamber and drop tube, and wherein the drop tube is a cylindrical member including one or more perforations; and a ground wheel, wherein the ground wheel is mechanically coupled to the fluted roller and roller shutoff via a drive chain and a shaft, and wherein, a rotation of the ground wheel causes a rotation of both the fluted roller and roller shutoff.

Aspects of the present disclosure relate to a drop spreading device, wherein the fluted roller includes exactly eight grooves.

Aspects of the present disclosure relate to a drop spreading device, wherein the outlet chamber includes a venturi channel disposed beneath the funnel.

Aspects of the present disclosure relate to a drop spreading device, wherein the funnel and venturi channel include a single piece of material.

Aspects of the present disclosure relate to a drop spreading device, wherein the drive chain is mechanically coupled to the shaft at a distal end of the shaft, and a jam nut is screwdly attached to a proximal end of the shaft, wherein the jam nut and fluted roller define a shutoff distance between the fluted roller and the jam nut, and wherein turning the jam nut causes an increase or decrease in the shutoff distance.

Aspects of the present disclosure relate to a drop spreading device, wherein the drop spreading device further includes a spring disposed around the shaft between the fluted roller and the roller shutoff, the spring configured to abut the roller shutoff against the jam nut.

Aspects of the present disclosure relate to a drop spreading device, further including a lifting actuator, a first arm, a second arm, and a hitch, wherein the lifting actuator is configured to selectably raise or lower of the first and second arms relative to the hitch.

Aspects of the present disclosure relate to a drop spreading device, wherein the drop tube further includes a spinner plate located at an approximate center of an interior of the drop tube.

Aspects of the present disclosure relate to a drop spreading device, wherein the spinner plate includes one or more fins.

Aspects of the present disclosure relate to a drop spreading device, wherein the spinner plate is configured to rotate about a spinner plate column.

Aspects of the present disclosure relate to a drop spreading device, wherein the fluted roller includes one or more brushes, wherein the one or more brushes define the grooves.

Aspects of the present disclosure relate to a drop spreading device, wherein the follower is replaced with two or more baffles, wherein each baffle includes one or more brushes.

Additional aspects related to this disclosure are set forth, in part, in the description which follows, and, in part, will be obvious from the description, or may be learned by practice of this disclosure.

It is to be understood that both the forgoing and the following descriptions are exemplary and explanatory only and are not intended to limit the claimed disclosure or application thereof in any manner whatsoever.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

The present disclosure may relate to a down burst seeder 100. The down burst seeder 100 may provide for uniform spreading of seeds without the need for a full width seed hopper, instead providing for use of a single seed hopper 102 paired with a true volumetric ground driven seed meter 106.

Figure 1:
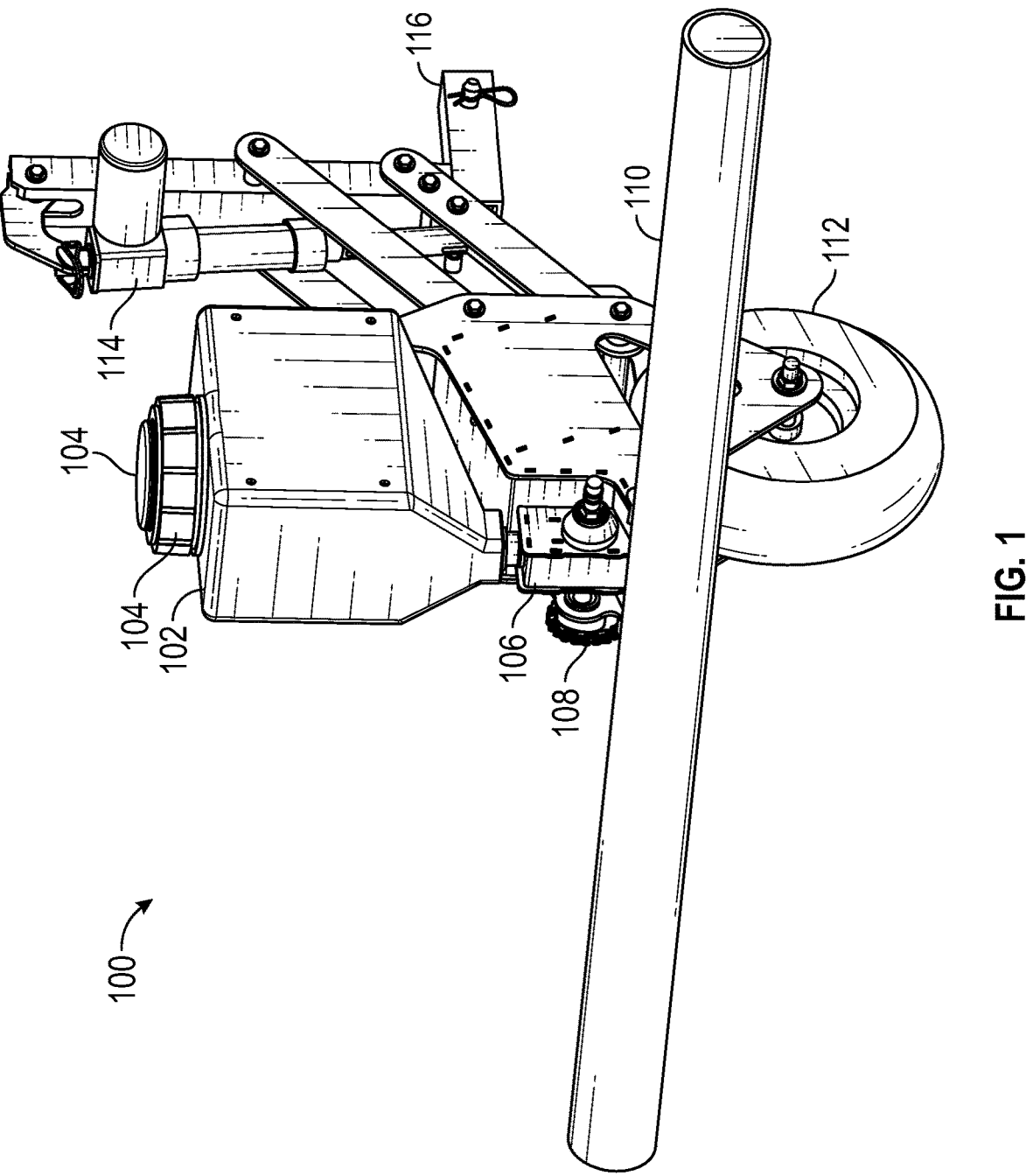
FIG. 1 shows a drop spreading device according to various aspects of the present disclosure.

Turning to FIG. 1, the down burst seeder 100 may include a seed hopper 102, a lid 104, a seed meter 106, a drive chain 108, a drop tube 110, a ground wheel 112, a lifting actuator 114, and a receiver hitch 116.

The seed hopper 102 may be configured to store a volume of material to be introduced into the seed meter 106. In an embodiment, such material includes seeds of one or more sizes. In an embodiment, the down burst seeder 100 is particularly efficient at the even distribution of small seeds. However, it is contemplated that other material may be used, such as fertilizer, soil, other material comprising fine particulates. The seed hopper 102 may be constructed from a variety of materials, including, polyethylene, polypropylene, polycarbonate, fiberglass, or any other suitable material. In an embodiment, the seed hopper 102 is cuboid in shape with a tapered lower portion as shown in FIG. 1. However, the seed hopper 102 may comprise any suitable shape, such as a cube, cylinder, or other suitable shape. In an embodiment, the seed hopper 102 includes one or more internal baffles (not shown) to prevent unwanted movement of the stored matter when the down burst seeder 100 is in use.

The seed hopper 102 may include a lid 104 to allow for easy access to, and prevent unwanted material from entering, the seed hopper 102. In an embodiment, the lid 104 removably attaches to the seed hopper 102 via a threaded interface. In another embodiment, the lid 104 is hingeably attached to the seed hopper 102, allowing access by moving the lid 104 between an open and closed configuration.

The lower portion of the seed hopper 102 may be fluidly connected with a seed meter 106 via an inlet 502 configured to introduce matter, such as seeds, from the seed hopper 102 into the seed meter 106. In an embodiment, the inlet 502 is attached to the seed meter 106 via a threaded interface. However, any suitable interface may be used as known to those of skill in the art.

The seed meter 106 may include a fluted roller 504, a follower 506, one or more brushes 508, and a funnel 510. The seed meter 106 may accurately dispense matter into the outlet chamber 514 and drop tube 110 by utilizing a bi-directional fluted roller 504. In an embodiment, the fluted roller 504 is driven via a drive chain 108 mechanically coupled to a ground wheel 112. The seed meter 106 is discussed in greater detail below.

Once matter has moved from the seed hopper 102 and then through the seed meter 106 and outlet chamber 514, said matter may enter a drop tube 110 such as the one shown in FIG. 1. The drop tube 110 may comprise an elongated cylindrical member configured to dispense seeds evenly along its length. While the drop tube 110 shown in FIG. 1 is cylindrical, any suitable shape may be utilized, such as cuboid, prism, or any other suitable shape. The drop tube 110 may be closed at either end to prevent the unwanted escape of matter being introduced into the 110. In an embodiment, the drop tube 110 is approximately 5 ft in length. However, any suitable length may be used.

The down burst seeder 100 may also include a support structure comprising a lifting actuator 114, a first arm 402, a second arm 404, and a receiver hitch 116. The support structure may enable the down burst seeder 100 to be configured in one of a raised or lowered configuration. Such configurations are discussed in greater detail below. The receiver hitch 116 may be configured to removably attach the down burst seeder 100 to a vehicle using traditional hitch structures as is known to those of skill in the art.

Figure 2:
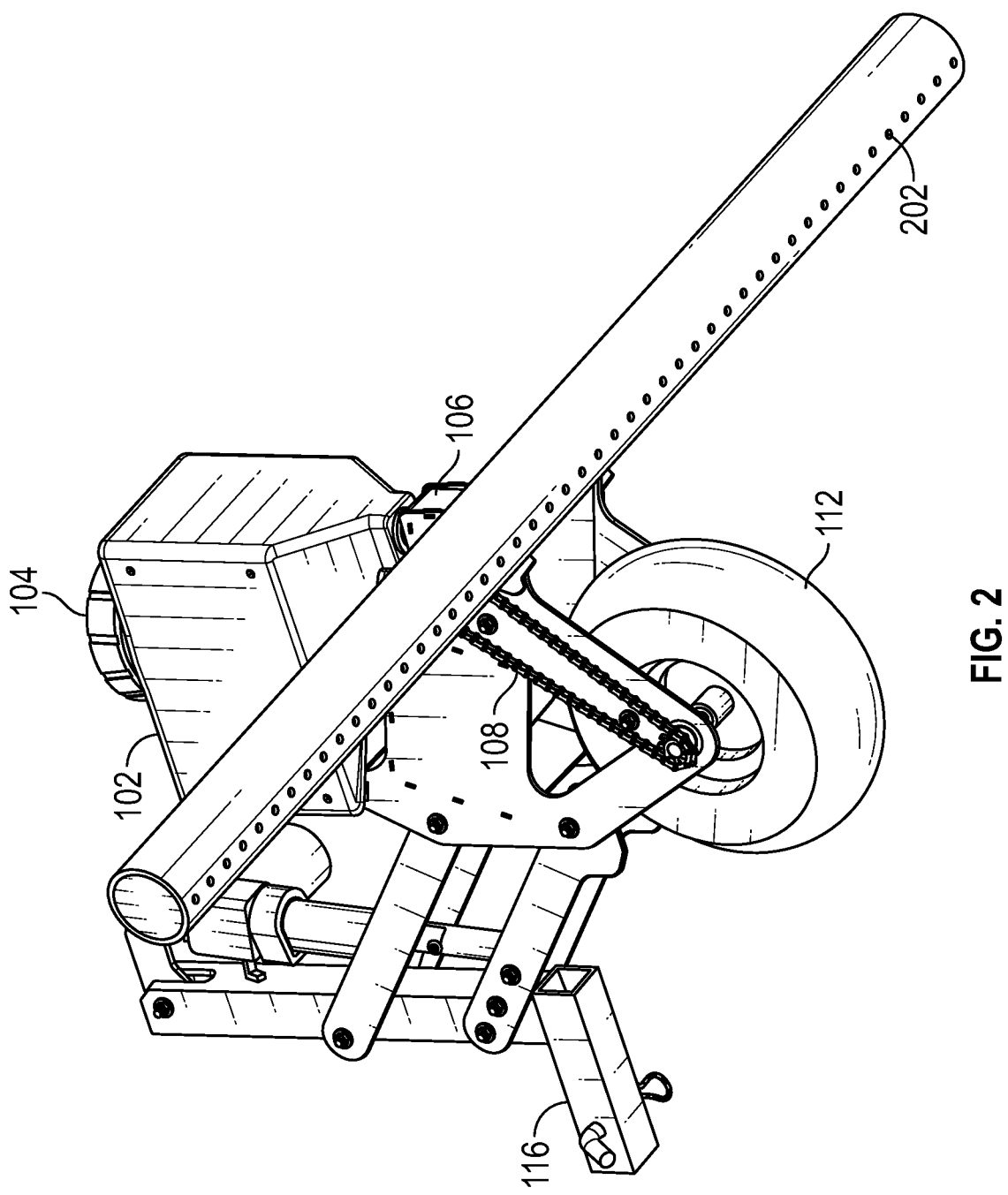
FIG. 2 shows a drop spreading device according to various aspects of the present disclosure.

Turning to FIG. 2, the drop tube 110 may include a one or more perforations 202. In an embodiment, a plurality of perforations 202 are disposed linearly along a length of the drop tube 110. However, other suitable arrangements are contemplated, such as a zig-zag arrangement. The perforations 202 may be sized appropriately to enable matter to pass through them. As a non-limiting example, the size of each perforation 202 is between ⅛" to ½". As another non-limiting example, the size of each perforation 202 may vary within the range of ½" and 1".

In order for the drop tube 110 to spread matter evenly, the cross-sectional area of all of the perforations 202 combined may be equal to the cross-sectional area of the blower 302, outlet chamber 514, and drop tube 110. This may maintain optimal the air flow, air velocity, and back pressure in the system.

Figure 3:
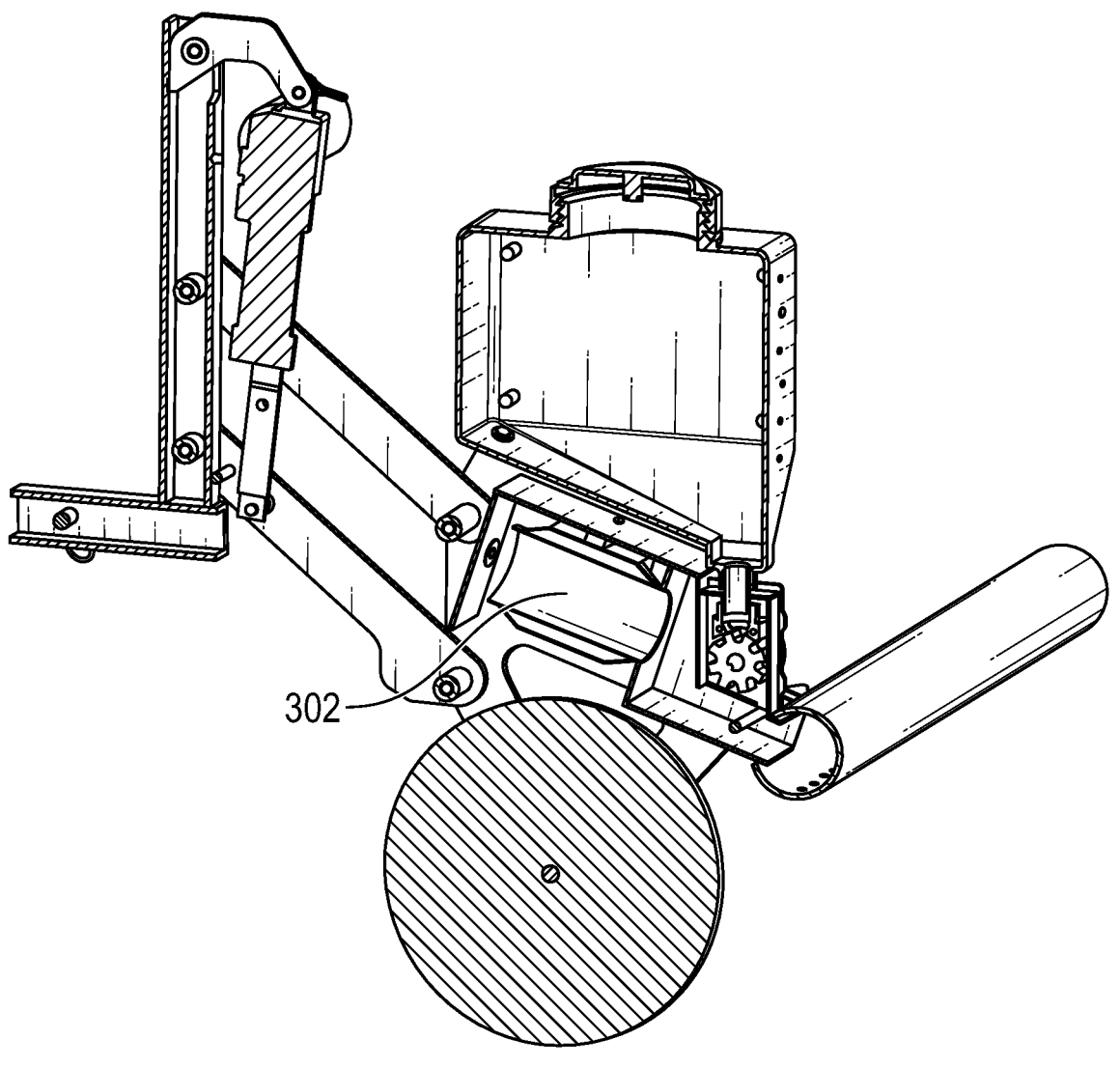
FIG. 3 shows a cross-sectional view of a drop spreading device according to various aspects of the present disclosure.

As shown in FIG. 3, a blower 302 may force air through the outlet chamber 514 and into the drop tube 110. As such, the blower 302 may be utilized to introduce the matter from the outlet chamber 514 into the drop tube 110. The blower 302 may include a cylindrical tube positioned adjacent to the outlet chamber 514 and seed meter 106, and may be fluidly connected therewith. The blower 302 may further include one or more fans (not shown) configured to propel air through the blower 302 and into the outlet chamber 514. In an embodiment, the one or more fans are mechanically coupled to the drive chain 108 such that, when the down burst seeder 100 is in use, the drive chain 108 engages both the seed meter 106 and the blower 302. In another embodiment, the blower 302 is engaged via independent means, such as via an electrical motor and portable power source, or via a gas-powered motor.

Figure 4A:
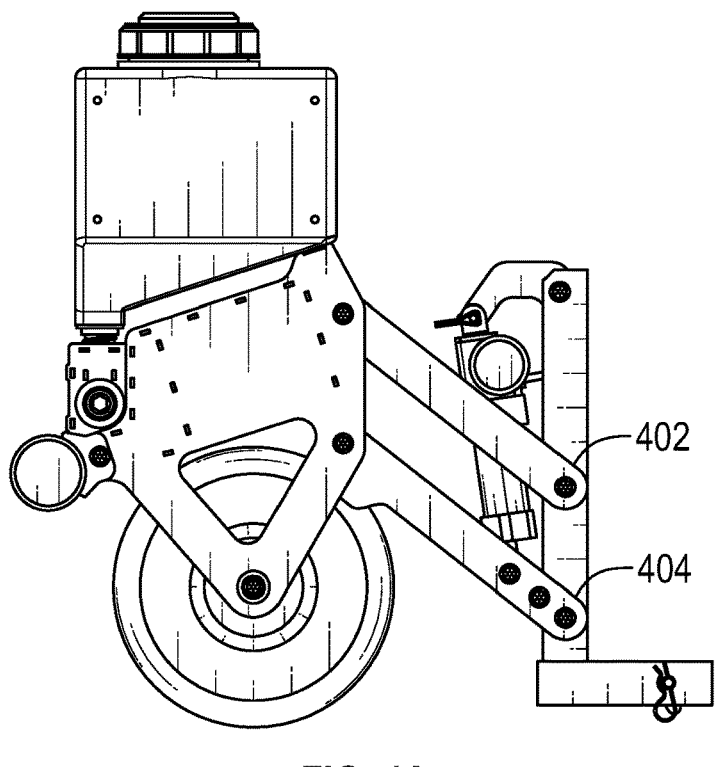
FIGS. 4A-B show a raised and lowered embodiment of a drop spreading device according to various aspects of the present disclosure.
Figure 4B:
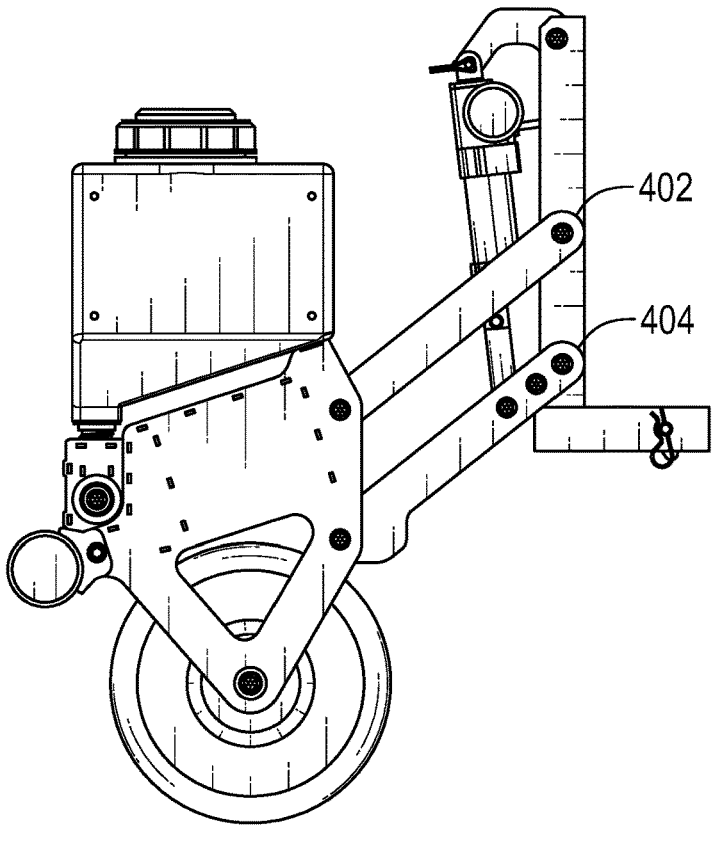

As disclosed above, the down burst seeder 100 may be configured in one of a raised or lowered configuration as shown in FIGS. 4A-B. In a raised configuration, as shown in FIG. 4A, the first arm 402 and second arm 404 may be raised relative to the receiver hitch 116 such that the ground wheel 112 is not in contact with the ground. In a lowered configuration, as shown in FIG. 4B, the first arm 402 and second arm 404 may be lowered relative to the receiver hitch 116 such that the ground wheel 112 is in contact with the ground. In an embodiment, the down burst seeder 100 is switched between the raised and lowered configurations via the lifting actuator 114. The lifting actuator 114 may be a hydraulic actuator. However, in alternative embodiments, the lifting actuator 114 may include a belt-driven or chain-driven system. The lifting actuator 114 may be powered via an internal or external power source. As a non-limiting example, the lifting actuator 114 is powered via a vehicles 12v power output. The lifting actuator 114 may be controlled via a remote fob. As such, the down burst seeder 100 may include wireless capability, such as Bluetooth, as is understood by those of skill in the art.

Figure 5:
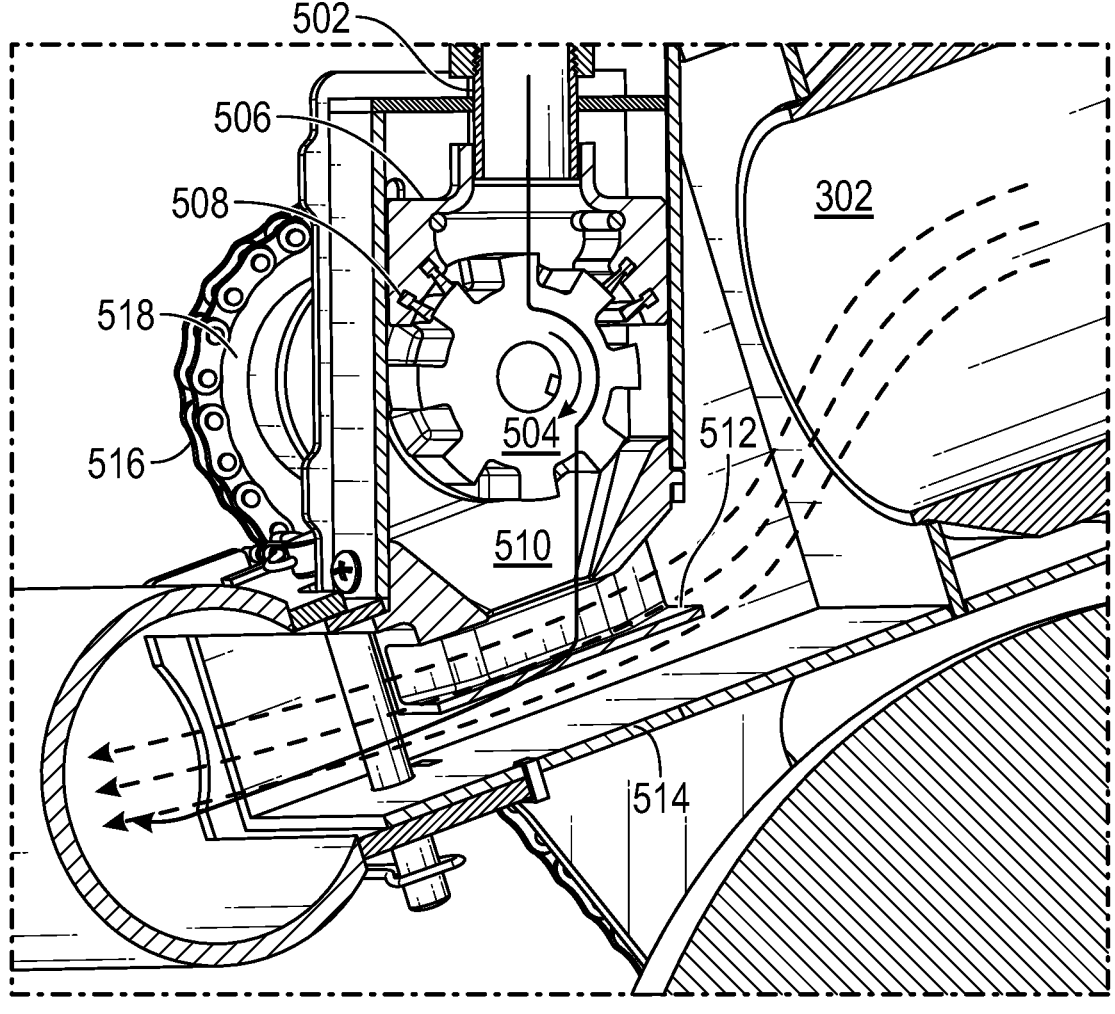
FIG. 5 shows a cross-sectional view of a seed meter according to various aspects of the present disclosure.

In an embodiment, the ground wheel 112 may engage the seed meter 106 via the drive chain 108. In such an embodiment, the ground wheel 112 may be mechanically coupled to the chain 516 and sprocket 518 as shown in FIG. 5, such that rotation of the ground wheel 112 may cause simultaneous rotation of the sprocket 518 via the chain 516. In such an embodiment, the seed meter 106 may be engaged by attaching the down burst seeder 100 to a vehicle via the receiver hitch 116 and towing the down burst seeder 100 behind said vehicle in a lowered configuration, causing the ground wheel 112 to rotate. The seed meter 106 may then be disengaged by transitioning the down burst seeder 100 into its raised configuration, causing the ground wheel 112 to lose contact with the ground and thus prevent any rotation of the ground wheel 112.

As discussed above, the seed meter 106 may provide for consistent and accurate dispersion of matter into the outlet chamber 514. The sprocket 518 may be mechanically coupled to the fluted roller 504. As shown in FIG. 5, the inlet may supply the seed meter 106 with matter from the seed hopper 102. In an embodiment, the inlet 502 may interface with a follower 506 configured to direct the matter onto a top portion of the fluted roller 504. The fluted roller 504 may include a plurality of grooves 704. Each groove 704 may be disposed across a length of the fluted roller 504. As a non-limiting example, the fluted roller 504 may include eight grooves 704. However, any suitable number of grooves 704 may be used, such as five or six grooves 704. The grooves 704 may have a depth configured to accommodate a desired volume of matter from the inlet 502.

In an embodiment, the follower 506 may include one or more brushes 508. Each brush 508 may protrude from the surface of the follower 506. The one or more brushes 508 may abut the surface of the fluted roller 504 between each groove 704. Such an embodiment may ensure that each groove 704 contains an accurate measure of matter by sweeping any excess matter back into an area defined by the follower 506, and may also provide a flexible surface to sweep the matter without causing damage. This may be achieved when the seed meter 106 is engaged, causing the fluted roller 504 to rotate in either a clockwise or anticlockwise direction. The follower 506 may include a plurality of brushes 508 disposed on opposing ends of the follower 506 to ensure that an accurate measure of matter when the fluted roller 504 rotates in either direction.

The seed meter 106 may include a funnel 510 to receive and direct matter from the fluted roller 504. Once the fluted roller 504 receives matter from the inlet 502, the fluted roller 504 may then rotate in either a clockwise or anticlockwise direction via the drive chain 108. Such motion may cause the matter to be transported via the grooves 704 past the brushes where it then falls down into the funnel 510. The funnel 510 may be conical in shape. However, any suitable shape may be used.

The funnel 510 may be fluidly connected to a venturi channel 512. The venturi channel 512 and funnel 510 may be formed from a single piece of material. In an embodiment, the venturi channel 512 extends from a bottom portion of the funnel 510 into the outlet chamber 514. The venturi channel 512 may create an area of low pressure beneath the funnel 510 to ensure the correct direction of travel of matter through the funnel 510 and into the outlet chamber 514. The venturi channel 512 may then accelerate the matter through the venturi channel 512 helping the matter spread evenly before entering the drop tube 110.

In an embodiment, the blower 302 may direct air through the outlet chamber 514 and into the drop tube 110. Some of the air directed through the outlet chamber 514 may pass through the venturi channel 512, causing matter in the venturi channel 512 to be carried through the venturi channel 512 into the outlet chamber 514. From there, the matter may then be carried into the drop tube 110. Once matter has entered the drop tube 110, the air flow created by the blower 302 may disperse the matter throughout the length of the drop tube 110 and through the one or more perforations 202.

Turning to FIG. 5, matter may flow through the seed meter 106 (shown in solid line). As a non-limiting example, matter may be gravitationally pulled from the inlet tube 502 to the fluted roller 504. As the fluted roller 504 rotates, matter may be carried in the grooves 704 through the seed meter 106. Additionally, as the fluted roller 504 rotates, one or more brushes may pass over the grooves 704 to level off any excess matter, which may ensure consistent distribution of matter and prevent undesired matter buildup within the seed meter 106. The fluted roller 504 may deliver the matter to the funnel 510. Matter may be drawn through the funnel 510 by airflow through the seed meter 106 (shown in broken line). Airflow may pass from the blower 302 to the venturi channel 512. The airflow through the venturi channel 512 may create an area of low pressure which may encourage matter to pass from the funnel 510 to the venturi tube 512. After the airflow and the matter meet in the venturi tube 512, both may be directed into the outlet chamber 514. The airflow encourage even distribution and disperse the matter before the matter is directed to the drop tube 110.

Figures 6A, 6B, 6C:
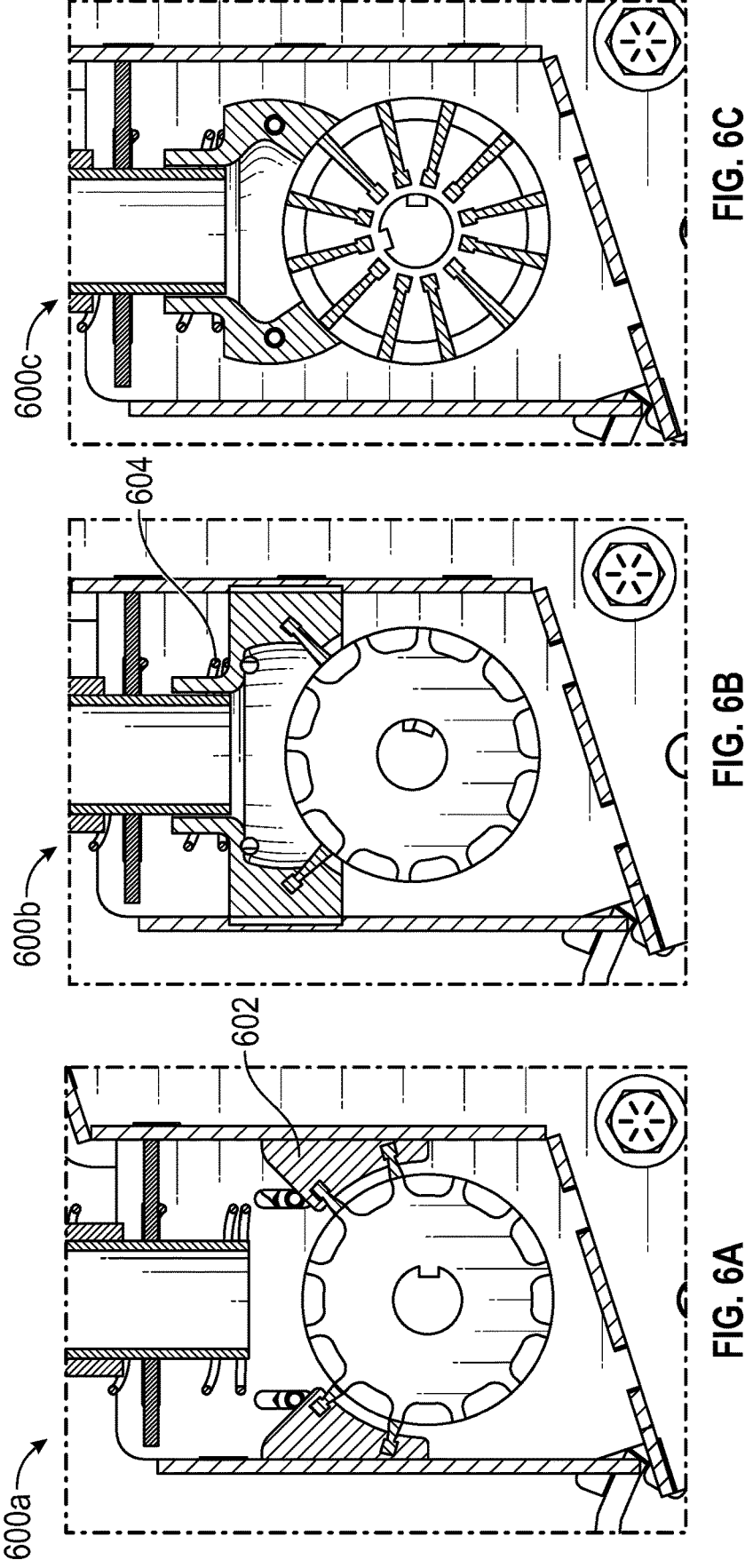
FIG. 6A shows a cross-sectional view of a brushed baffle system according to various aspects of the present disclosure.
FIG. 6B shows a brushed follower system according to various aspects of the present disclosure.
FIG. 6C shows a brushed roller system according to various aspects of the present disclosure.

Different embodiments of the fluted roller 504, follower 506, and one or more brushes 508 may make up the brushed baffle system 600a, brushed follower system 600b, and brushed roller system 600c shown in FIGS. 6A-C. The brushed baffle system 600a include a fluted roller 504 and may replace the follower 506 with two or more baffles 602 disposed at opposing ends of the seed meter 106. Each follower 602 may include one or more brushes 508. The brushed follower system 600b may include a fluted roller 504 and follower 506. The fluted roller 504 shown in FIG. 6C may include one or more brushes 508 as discussed in relation to FIG. 5 above. As is illustrated in FIGS. 6A-C, a spring 604 may maintain downward pressure of the one or more brushes 508 against the fluted roller 504. In such an embodiment, the follower 506 is able to move vertically, which prevents unwanted shearing of any matter that may be protruding from the one or more grooves 704. The brushed roller system 600c may include a follower 506 having no brushes 508, with the one or more brushes 508 being instead disposed within the fluted roller 504. In such an embodiment, the one or more brushes 508 may define the grooves 704.

Figure 7:
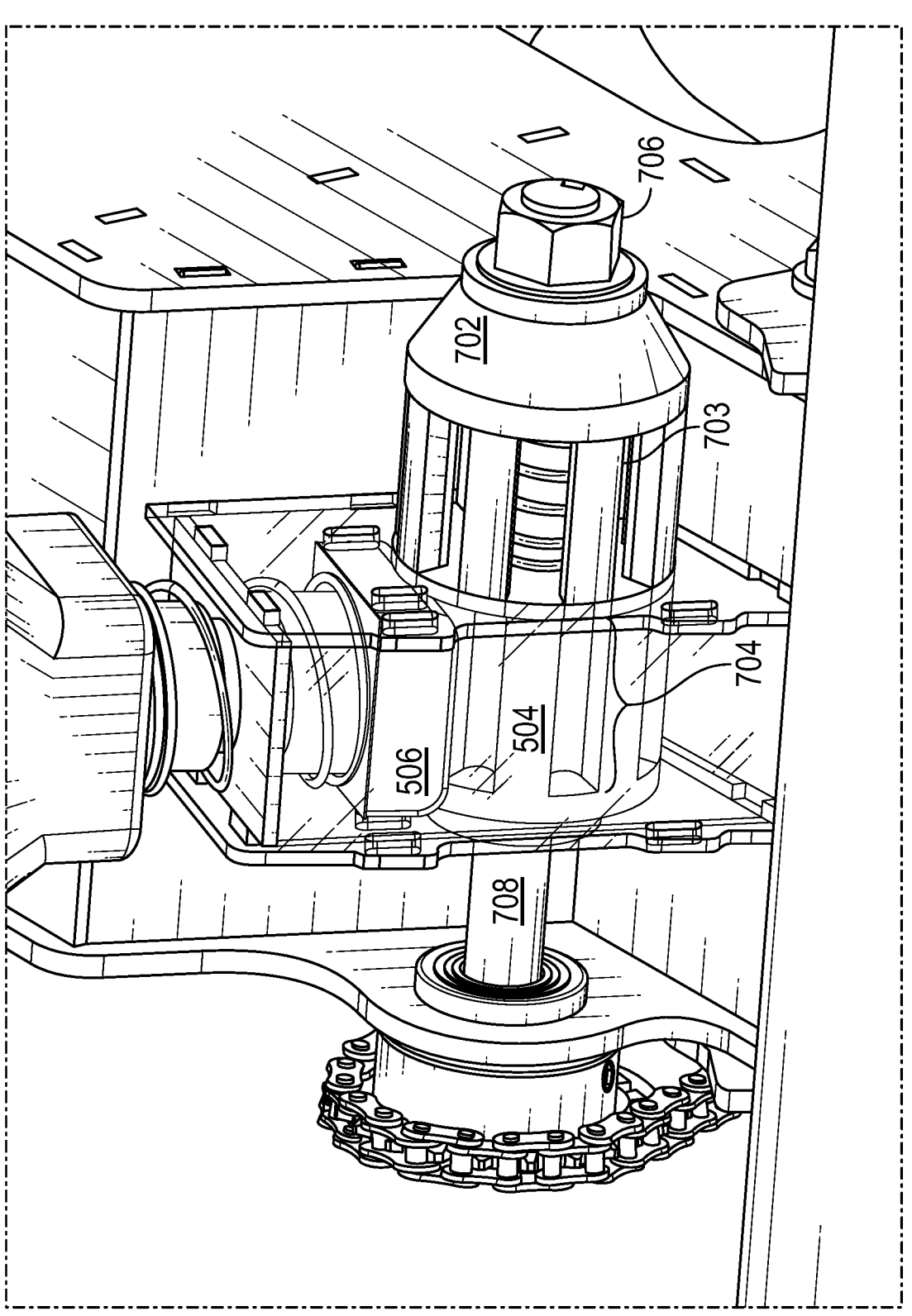
FIG. 7 shows a seed meter according to various aspects of the present disclosure.

Turning to FIG. 7, a roller shutoff 702 may be used to precisely control the amount of matter passing through the seed meter 106 (i.e., the "flow rate"). In such an embodiment, the roller shutoff 702 may include one or more teeth 703. Each of the one or more teeth 703 may be configured to interface with the one or more grooves 704 such that the length of each groove 704 may be shortened by an increasing amount of each of the one or more teeth 703 occupying the one or more grooves 704.

Figure 8A:
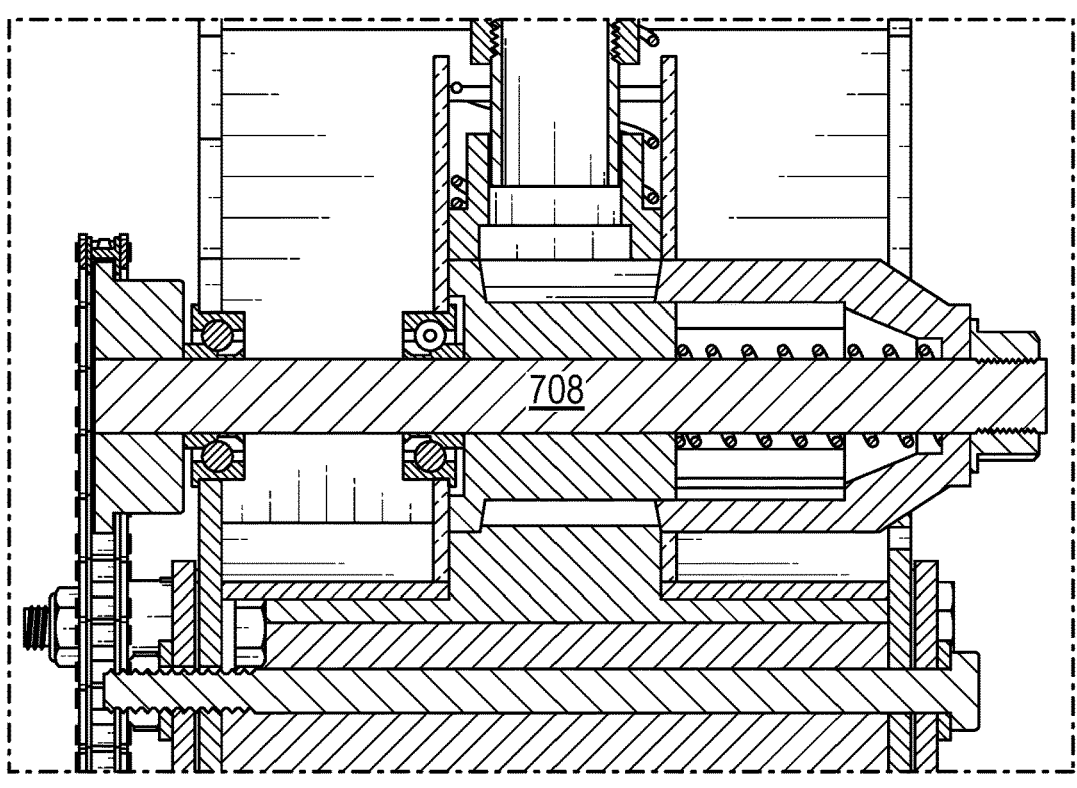
FIGS. 8A-B show a cross-sectional view of a seed meter according to various aspects of the present disclosure.
Figure 8B:
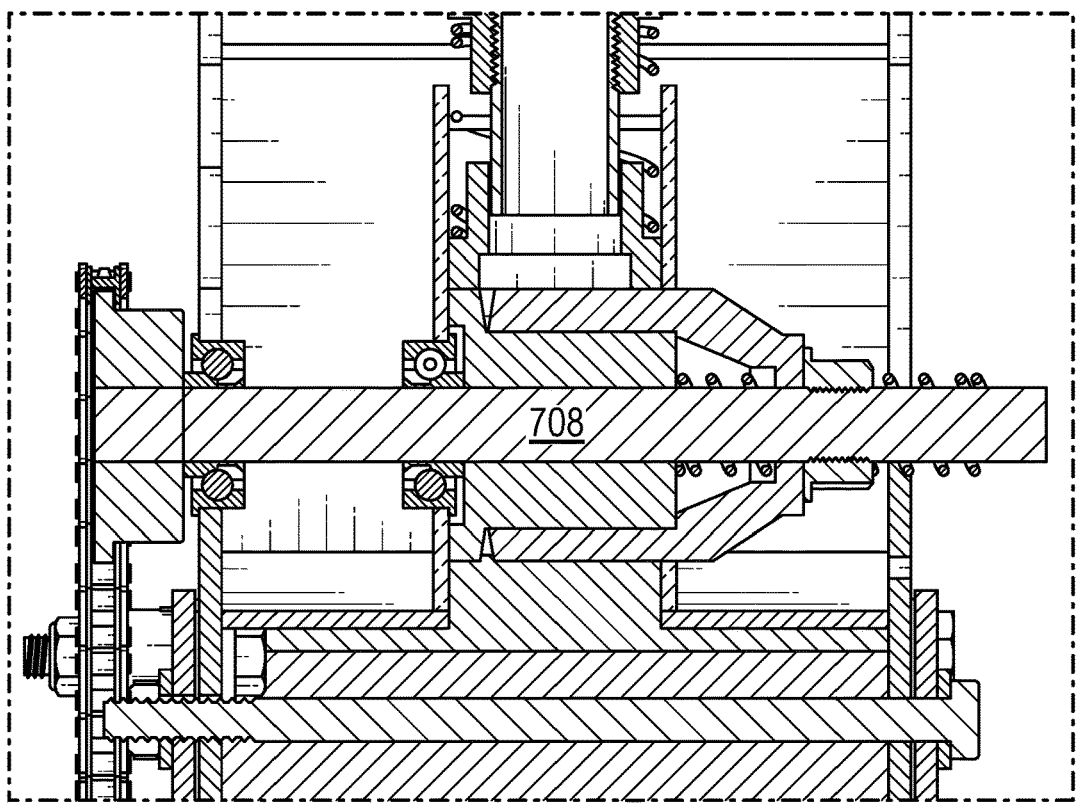

FIGS. 8A-B illustrate how the length of each groove 704 may be adjusted. In an embodiment, the roller shutoff 702 and fluted roller 504 may be mechanically coupled to the drive chain 108 via a shaft 708. The sprocket 518 of the drive chain 108 may be mounted to a distal end of the shaft 708. A jam nut 706 may be attached to a proximal end of the shaft 708 and may define a shutoff distance between the fluted roller 504 and the jam nut 706. The roller shutoff 702 may be abutted against the jam nut 706 via a spring 604 disposed along the shaft 708. The spring 604 may be disposed between the fluted roller 504 and the roller shutoff 702.

The jam nut 706 may be screwdly engageable with the shaft 708 such that turning the jam nut 706 results in a change in the shutoff distance. Such change in the shutoff distance may directly correlate to change in length of the one or more teeth 703 occupying each groove 704. As a non-limiting example, if a user wishes to decrease the flow-rate of matter through the seed meter 106, the user may rotate the jam nut 706 so as to cause a reduction in shutoff distance and increasing the length of the one or more teeth 703 occupying the grooves 704. As exemplified in FIGS. 8A-B, rotating the groove 704 may enable a user to move the roller shutoff 702 between the position of the roller shutoff 702 shown in FIG. 8A, and the position of the roller shutoff 702 shown in FIG. 8B.

Figure 9:
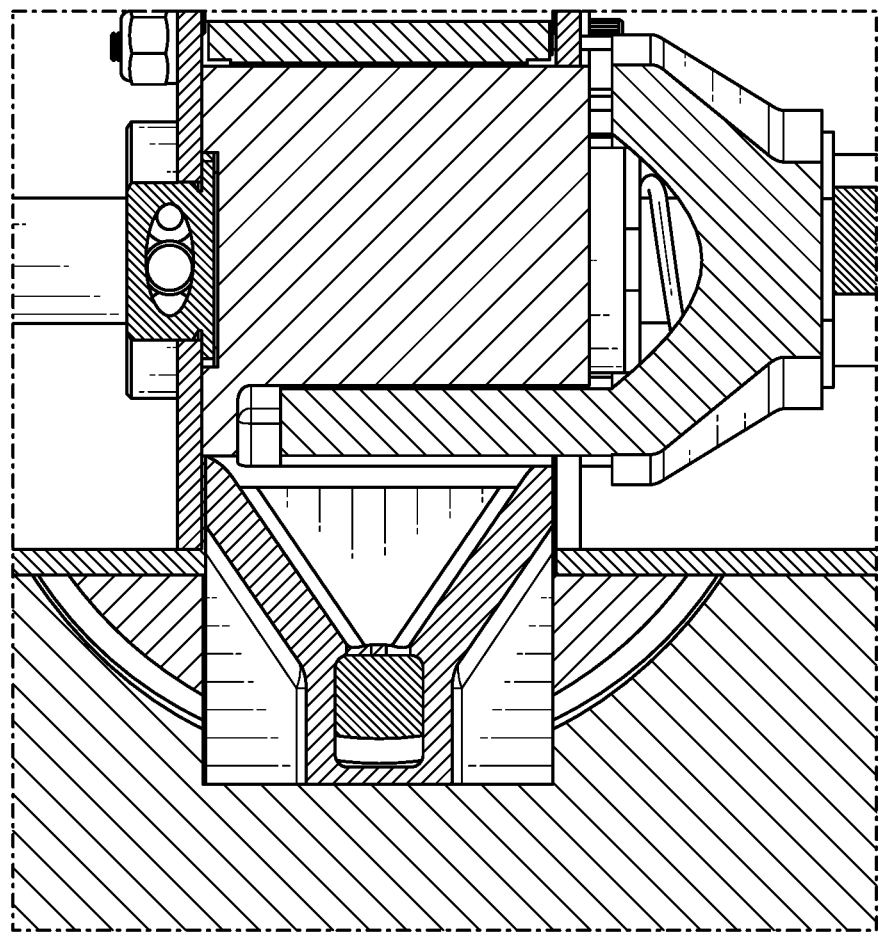
FIG. 9 shows a cross-sectional view of a seed meter according to various aspects of the present disclosure.

FIG. 9 exemplifies the advantage of being to control the flow rate of matter through the seed meter 106. As shown in FIG. 9, the teeth 703 may be configured to occupy a volume of the one or more grooves 704, leaving a desired volume of the one or more grooves 704 to receive matter from the seed hopper 102. The funnel 510 may then receive the matter transported via the exposed volume of the one or more grooves 704, and direct it into the venturi channel 512.

Figure 10:
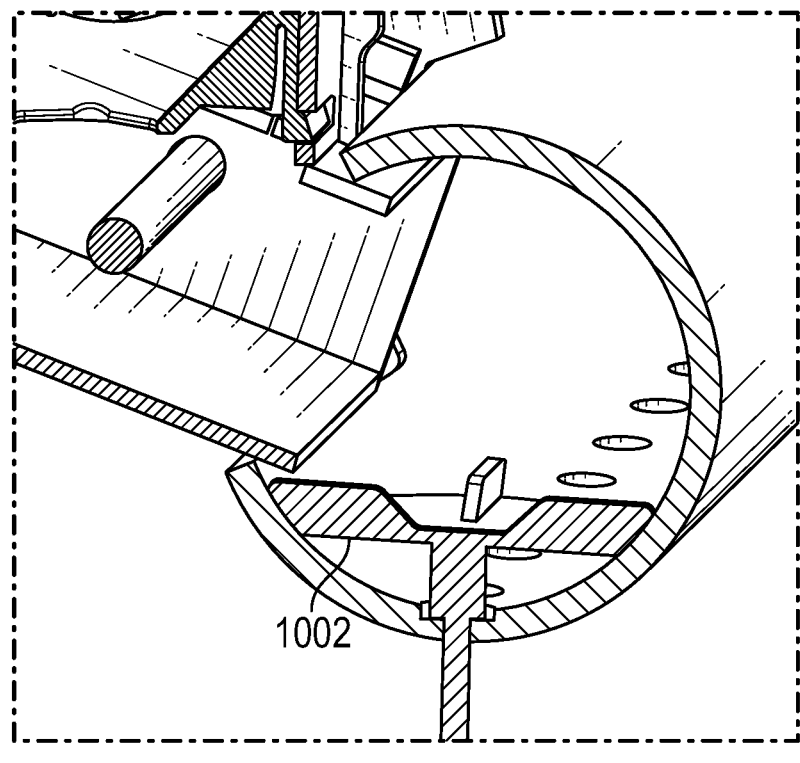
FIG. 10 shows a cross-sectional view of a spinner plate according to various aspects of the present disclosure.
Figure 11:
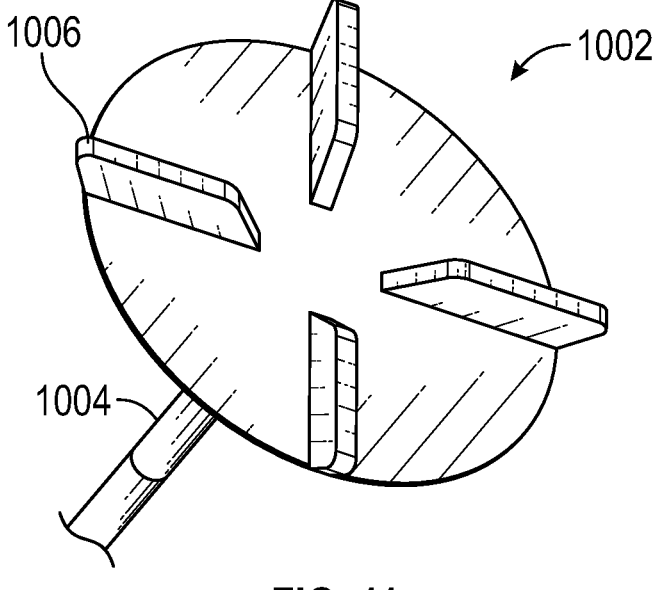
FIG. 11 shows a spinner plate according to various aspects of the present disclosure.

As shown in FIGS. 10-11, the drop tube 110 may include a spinner plate 1002 to assist with even dispersion of matter across the length of the drop tube 110. In an embodiment, the spinner plate 1002 spins about a spinner plate column 1004. The spinner plate 1002 may include one or more fins 1006. As a non-limiting example, matter entering the drop tube 110 from the outlet chamber outlet chamber 514 may make contact with the spinner plate 1002 and one or more fins 1006 thereon. The one or more fins 1006 may then make contact with the matter, and centrifugal force created by the spinner plate 1002 may expel the matter throughout the length of the drop tube 110.

Figure 12A:
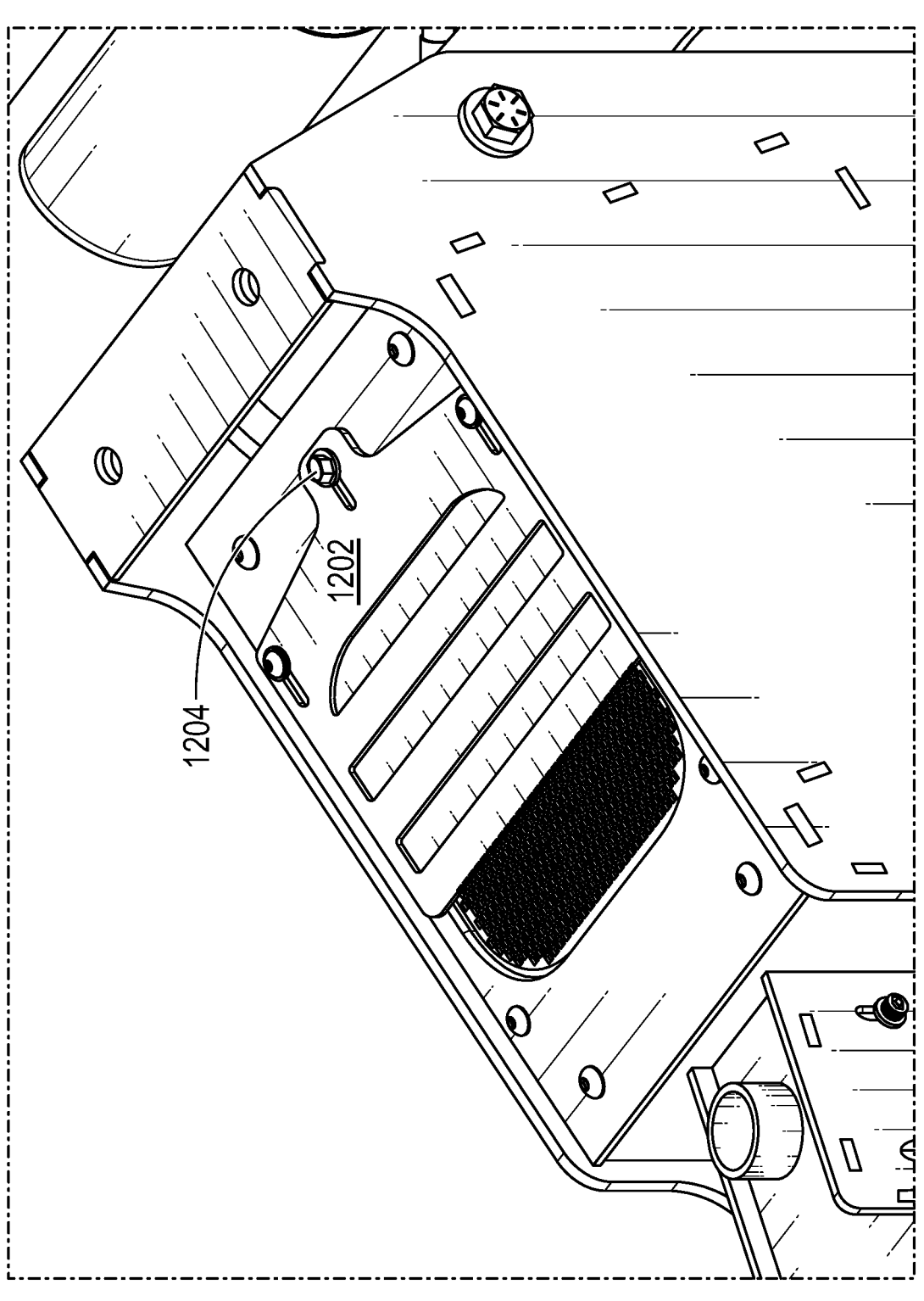
FIGS. 12A-B show a closed and open embodiment of an adjustable air baffle according to various aspects of the present disclosure.
Figure 12B:
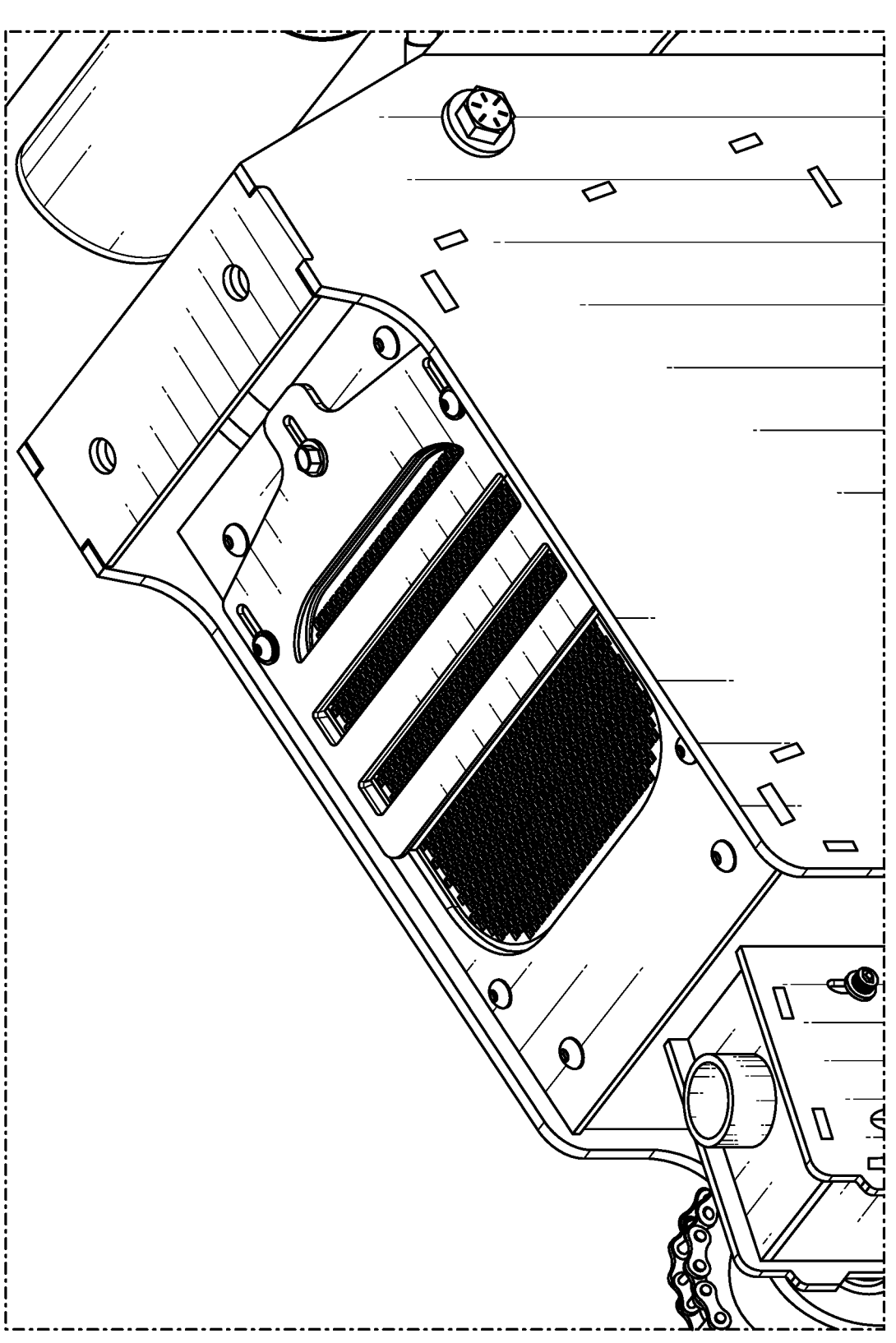

FIGS. 12A-B illustrate an adjustable air baffle 1202 according to aspects of the present disclosure. The air baffle 1202 may be disposed above the blower 302 and may supply the blower 302 with air from outside the down burst seeder

100. In an embodiment, the air baffle 1202 may be configured between a closed and open configuration to control air flow through the outlet chamber 514 and drop tube 110. The air baffle 1202 may be slidably attached to the down burst seeder 100 via one or more adjustment screws 1204. As a non-limiting example, the one or more adjustment screws 1204 may be tightened to secure the air baffle 1202 in a desire positioned. The closed configuration, shown in FIG. 12A, may restrict air flow through the outlet chamber 514 and drop tube 110. Such an embodiment may be particularly useful for carrying and spreading matter comprising small, light particulates. The open configuration, shown in FIG. 12B, may maximize air flow through the outlet chamber 514 and drop tube 110. Such an embodiment may be particularly useful for carrying and spreading matter comprising larger, heavier particulates.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A drop spreading device, comprising:
   a seed hopper disposed above and fluidly connected to a seed meter, the seed meter comprising:
   a follower disposed above a fluted roller, the follower including one or more brushes,
   wherein the fluted roller includes one or more grooves, and
   wherein the one or more brushes are configured to abut portions of the fluted roller located between the one or more grooves;
   a roller shutoff disposed adjacent to the fluted roller, the roller shutoff including one or more teeth,
   wherein the one or more teeth are configured to interface with the one or more grooves by selectably occupying a volume of the one or more grooves;
   a funnel disposed beneath the fluted roller and fluidly connected to an outlet chamber, the outlet chamber fluidly connected to the funnel, a blower, and a drop tube,
   wherein the blower is configured to introduce air into the outlet chamber and drop tube, and
   wherein the drop tube is a cylindrical member including one or more perforations; and
   a ground wheel,
   wherein the ground wheel is mechanically coupled to the fluted roller and roller shutoff via a drive chain and a shaft, and
   wherein, a rotation of the ground wheel causes a rotation of both the fluted roller and roller shutoff.

2. The drop spreading device of claim 1, wherein the fluted roller includes exactly eight grooves.

3. The drop spreading device of claim 1, wherein the outlet chamber includes a venturi channel disposed beneath the funnel.

4. The drop spreading device of claim 3, wherein the funnel and venturi channel comprise a single piece of material.

5. The drop spreading device of claim 1, wherein the drive chain is mechanically coupled to the shaft at a distal end of the shaft, and a jam nut is screwdly attached to a proximal end of the shaft,
   wherein the jam nut and fluted roller define a shutoff distance between the fluted roller and the jam nut, and wherein turning the jam nut causes an increase or decrease in the shutoff distance.

6. The drop spreading device of claim 5, wherein the drop spreading device further includes a spring disposed around the shaft between the fluted roller and the roller shutoff, the spring configured to abut the roller shutoff against the jam nut.

7. The drop spreading device of claim 1, further comprising a lifting actuator, a first arm, a second arm, and a hitch, wherein the lifting actuator is configured to selectably raise or lower of the first and second arms relative to the hitch, wherein the lifting actuator, via mechanical movement of the first arm and the second arm, is configured to convert the drop spreading device between a raised configuration and a lowered configuration, wherein, in the raised configuration, the ground wheel does not contact a ground surface and, in the lowered configuration, the ground wheel does contact the ground surface.

8. The drop spreading device of claim 1, wherein the drop tube further includes a spinner plate located at an approximate center of an interior of the drop tube.

9. The drop spreading device of claim 8, wherein the spinner plate includes one or more fins.

10. The drop spreading device of claim 9, wherein the spinner plate is configured to rotate about a spinner plate column.

11. A drop spreading device, comprising:
a seed hopper disposed above and fluidly connected to a seed meter, the seed meter comprising:

two or more baffles disposed above a fluted roller, the two or more baffles including one or more brushes,
wherein the fluted roller includes one or more grooves, and
wherein the one or more brushes are configured to abut portions of the fluted roller located between the one or more grooves;
a roller shutoff disposed adjacent to the fluted roller, the roller shutoff including one or more teeth,
wherein the one or more teeth are configured to interface with the one or more grooves by selectably occupying a volume of the one or more grooves;
a funnel disposed beneath the fluted roller and fluidly connected to an outlet chamber, the outlet chamber fluidly connected to the funnel, a blower, and a drop tube,
wherein the blower is configured to introduce air into the outlet chamber and drop tube, and
wherein the drop tube is a cylindrical member including one or more perforations; and
a ground wheel,
wherein the ground wheel is mechanically coupled to the fluted roller and roller shutoff via a drive chain and a shaft, and
wherein, a rotation of the ground wheel causes a rotation of both the fluted roller and roller shutoff.

* * * * *